May 11, 1926.

J. USIECH

LOCK FOR AUTOMOBILES

Original Filed May 26, 1924

1,584,204

INVENTOR
John Usiech
BY
ATTORNEY

Patented May 11, 1926.

1,584,204

UNITED STATES PATENT OFFICE.

JOHN USIECH, OF NEW WESTMINSTER, BRITISH COLUMBIA, CANADA.

LOCK FOR AUTOMOBILES.

Application filed May 26, 1924. Serial No. 715,807.

This invention relates to a lock intended for use in connection with automobiles to lock desired parts of the latter, the invention being here in the form of a padlock. The invention has for an object the provision of a novel and simple lock of this type.

For further comprehension of the invention, and of the objects and advantages thereof, reference will be had to the following description and accompanying drawing, and to the appended claims in which the various novel features of the invention are more particularly set forth.

Fig. 1 of the drawing is a longitudinal sectional view with parts in elevation, of my improved lock.

Figure 1:
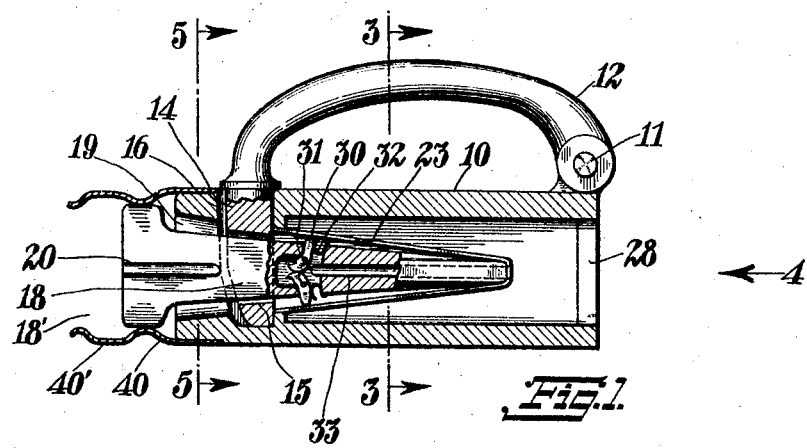
Figure 2:
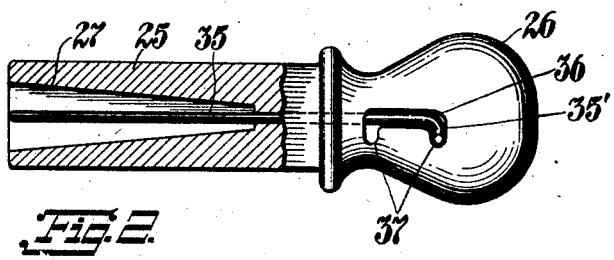
Fig. 2 is a like view of the key.
Figures 3, 4:
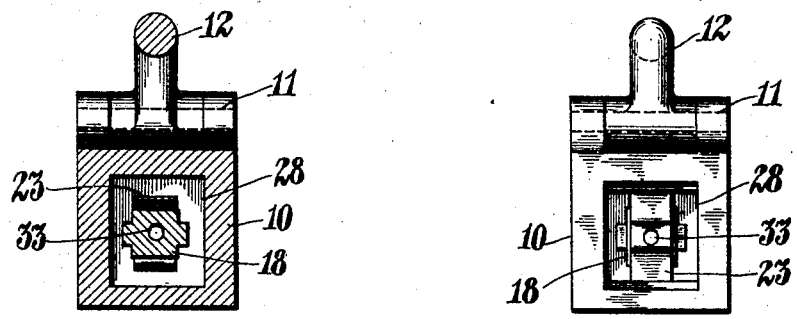
Fig. 3 is a transverse sectional view taken on the line 3—3 of Fig. 1.
Fig. 4 is an end view.
Figure 5:
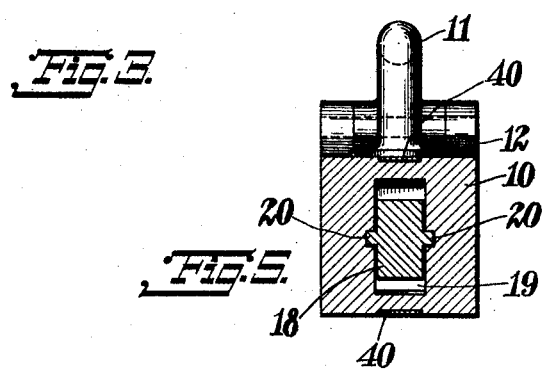
Fig. 5 is a transverse sectional view taken on the line 5—5 of Fig. 1.

As here embodied my improved lock comprises an elongated rectangular casing 10 to one end of which is hinged as at 11 the shackle 12. This shackle is provided on its free end with an apertured projecting tongue 14, the aperture in the tongue being indicated at 15. This tongue is adapted to be projected into the other end of the casing 10 transversely of the latter, the casing being provided with a suitable aperture 16 in the side thereof in which the tongue engages. The tongue 14 is adapted to be held in the casing 10, and thereby retain the shackle 12 locked, by means of a bolt 18 which is in the form of a wedge and which is inserted through an opening 19 in the adjacent end of the casing 10 and through the aperture 15 in the tongue 14. Longitudinal ribs such as 20 may be formed on the sides of the bolt 18 and adapted to engage complementary grooves in the side walls of the opening 19 to guide the bolt during insertion. Fixed to the narrow end of the bolt 18 and extending freely back along the tapering sides of the latter are the flat springs 23 whose free ends are adapted to engage behind the tongue 14 and prevent withdrawal of the same from the casing, the opening 15 in the tongue being large enough to permit of passage of the bolt outward when the springs 23 are compressed against the bolt.

To compress the springs 23 against the bolt, and thereby permit of withdrawal of the latter, I provide a key comprising a shank 25 and handle 26, the shank having formed therein a socket 27 which is tapered in accordance with the tapering of the bolt and which is adapted to receive the latter, the key being inserted into the casing through an opening 28 in the end of the latter opposite to that through which the bolt is inserted. The springs 23 are normally retained in their outwardly expanded position holding the bolt 18 against withdrawal, by their own resiliency, while I preferably provide in addition a supplementary means for retaining the springs expanded.

As here shown a pair of abutment latches 30 are pivoted as at 31 in a recess in the bolt and are held in outwardly projected position bearing on the undersides of the springs 23 by means of the small springs 32 bearing on said latches. These latches are provided with angular tail-pieces which project across the end of a longitudinal passage 33 in the bolt. Slidably mounted in the key and adapted for rotation also, is a rod 35 which is adapted to engage in the passage 33 in the bolt when the key is inserted into the casing and bear on the tail-pieces of the latches 30 to move the latter away from position forming abutments for the springs 23. The rod 35 is normally drawn back within the confines of the key and is projected therefrom at its forward end when the key is to be inserted in the lock, the handle of the key being formed with a longitudinal slot 36 through which the offset rear end 35' of the rod 35 projects, the slot having at opposite ends thereof the offsets 37 into which the said rear end of the rod projects. To retain the bolt 18 in the casing 10 in a position which permits its ready withdrawal therefrom I may mount on opposite sides of the casing the springs 40 which have suitably curved members 40' which are adapted to yieldingly grip the enlarged head 18' of the bolt and hold it in position with the free ends of the springs 23 not engaged behind the tongue 14.

Having thus described my invention, what I claim as new and desire to protect by Letters Patent of the United States is as follows:—

1. A lock of the type described comprising a casing, a shackle hinged thereto and having an apertured tongue on its free end adapted to engage in the casing, and a bolt removable from the casing and projecting through the aperture in the tongue to hold the latter in place in the casing, and key controlled elements retaining the said bolt against displacement from the casing, said elements comprising flat springs fixed at one end to the inner end of the bolt and adapted to have their free ends engage behind the said tongue, and key controlled abutment latches adapted to hold said springs in operative position.

2. A lock of the type described comprising an elongated casing having an aperture in each end thereof and a third aperture in the side thereof adjacent one end thereof, a shackle being hinged to the other end of said casing and having an apertured tongue on its free end adapted to engage in the said third aperture, a tapered bolt inserted freely in the adjacent end aperture and projecting through the aperture in the tongue a pair of flat springs fixed at one end to the inner end of the bolt and having their opposite ends normally expanded away from the bolt and engaging behind the said tongue to retain the bolt against displacement from the casing, and a pair of abutment latches hinged in the said bolt and holding said springs in expanded position, said latches being adapted to be moved to inoperative position and said springs being adapted to be compressed against the bolt to permit of withdrawal of the latter by a key inserted in the other end aperture in the casing.

In testimony whereof I have affixed my signature.

JOHN USIECH.